US007085654B2

(12) United States Patent
MacInnis

(10) Patent No.: US 7,085,654 B2
(45) Date of Patent: Aug. 1, 2006

(54) PHASE BASED SYSTEM AND METHOD FOR DETERMINING SIGNAL CONSISTENCY

(75) Inventor: Alexander G. MacInnis, Lake Oswego, OR (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 11/001,850

(22) Filed: Dec. 2, 2004

(65) Prior Publication Data

US 2006/0122813 A1 Jun. 8, 2006

(51) Int. Cl.
*G06F 19/00* (2006.01)

(52) U.S. Cl. ........................................................ 702/32

(58) Field of Classification Search .................. 702/32, 702/106, 75, 74, 71

See application file for complete search history.

(56) References Cited

U.S. PATENT DOCUMENTS 6,680,991 B1 * 1/2004 Gutierrez .................... 375/373

2001/0044713 A1 * 11/2001 Lokhoff et al. ............. 704/201

* cited by examiner

*Primary Examiner*—Michael Nghiem
*Assistant Examiner*—Cindy D. Khuu
(74) *Attorney, Agent, or Firm*—McAndrews, Held & Malloy, Ltd.

(57) ABSTRACT

A phase based system and method for determining signal consistency (e.g., in a video signal processing system). Various aspects of the present invention may, for example, include receiving a first and second signal, each of which includes a respective first sub-signal. A receiving module may, for example, affect such receiving. The first and second signals may be synchronized according to, at least in part, aspects of their respective first sub-signals. A signal synchronization module may, for example, effect such synchronization. Phase difference between respective sub-signals of the first and second synchronized signals may be determined (e.g., using sample-wise multiplication). Multiplication and accumulator modules may, for example, effect such a determination. A signal may be generated that is indicative of signal consistency based, at least in part, on the determination of phase difference between the respective sub-signals. An output module may, for example, effect such a signal generation.

20 Claims, 5 Drawing Sheets

100

110 START

120 Synchronize first and second signals based on first sub-signals

130 Sample-wise multiply respective sub-signals

140 Accumulate results of sample-wise multiplication

150 Determine indication of signal consistency

160 CONTINUE

PHASE BASED SYSTEM AND METHOD FOR DETERMINING SIGNAL CONSISTENCY

CROSS-REFERENCE TO RELATED APPLICATIONS/INCORPORATION BY REFERENCE

Not Applicable

FEDERALLY SPONSORED RESEARCH OR DEVELOPMENT

Not Applicable

SEQUENCE LISTING

Not Applicable

MICROFICHE/COPYRIGHT REFERENCE

Not Applicable

BACKGROUND OF THE INVENTION

Signal processing systems generally receive one or more input signals to utilize in signal processing. Signal processing systems may, for example, process the input signals(s) directly or may utilize information contained in such input signals(s) to process other signals.

Signal characteristics of signals input to signal processing systems may vary. Such variations may comprise, for example, signal strength variations, signal noise variations, data rate variations, information encoding variations, phase variations and timing variations, to name a few. Input signal characteristics may vary between different input signals and may vary within a single input signal. For example and without limitation, in a scenario where an input signal comprises multiple sub-signals, the sub-signals may have a phase relationship relative to each other. The phase relationship may be relatively stable and predictable or may be relatively unstable and unpredictable.

Signal processing systems may process or otherwise utilize input signals with varying signal characteristics. In such scenarios, aspects of the signal processing operations performed may depend on the varying signal characteristics.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a phase based system and method for determining signal consistency (e.g., in a video signal processing system). Various aspects of the present invention may, for example, comprise receiving a first and second signal, each of which comprises a respective first sub-signal. A receiving module may, for example, effect such receiving. The first sub-signal may comprise, for example, periodic or non-periodic synchronization information. The first and second signals may also each comprise, for example, respective second sub-signals. The second sub-signal may comprise, for example, data information, audio information, video information, or synchronization information. The first and second sub-signals may, for example, be integrated, time multiplexed, frequency multiplexed, code multiplexed and/or space multiplexed.

The first and second signals may be synchronized (e.g., temporally synchronized) according to, at least in part, aspects of their respective first sub-signals. A signal synchronization module may, for example, effect such synchronization. For example, the first and second signals may be temporally synchronized by phase-locking their respective first sub-signals. Alternatively, for example, the first and second signals may be synchronized by detecting a synchronization signal in at least one of the first sub-signals, determining a temporal shift based, at least in part, on the detected synchronization signal, and temporally shifting at least one of the first and second signals according to the determined temporal shift.

The first and second signals may, for example, be synchronized (e.g., temporally synchronized) according to, at least in part, aspects of their respective second sub-signals. A signal synchronization module may, for example, effect such synchronization. For example, the first and second signals may be temporally synchronized by phase-locking their respective second sub-signals. Alternatively, for example, the first and second signals may be synchronized by detecting a synchronization signal in at least one of the second sub-signals, determining a temporal shift based, at least in part, on the detected synchronization signal, and temporally shifting at least one of the first and second signals according to the determined temporal shift.

Phase difference between respective sub-signals of the first and second synchronized signals may be determined (e.g., using sample-wise multiplication). Multiplication and accumulator modules may, for example, effect such a determination. In an exemplary scenario, a multiplication module may multiply the respective sub-signals on a sample-by-sample basis, and an accumulator module may accumulate the results of the sample-wise multiplication over a time period.

A signal may be generated that is indicative of signal consistency based, at least in part, on the determination of phase difference between the respective sub-signals. An output module may, for example, effect such a signal generation. Generating a signal indicative of signal consistency may comprise, for example, generating a signal indicative of relative phase difference between respective first and/or second sub-signals of the synchronized first and second signals. Alternatively, for example, generating such a signal may comprise comparing a determined phase difference to a threshold, and generating a signal indicative of the threshold comparison. Alternatively, for example, generating such a signal may comprise compiling phase difference information for a plurality of signals, performing statistical analysis of such differential phase information, and generating a signal based at least in part on the statistical analysis.

These and other advantages, aspects and novel features of the present invention, as well as details of illustrative aspects thereof, will be more fully understood from the following description and drawings.

DETAILED DESCRIPTION OF THE INVENTION

Figure 1:
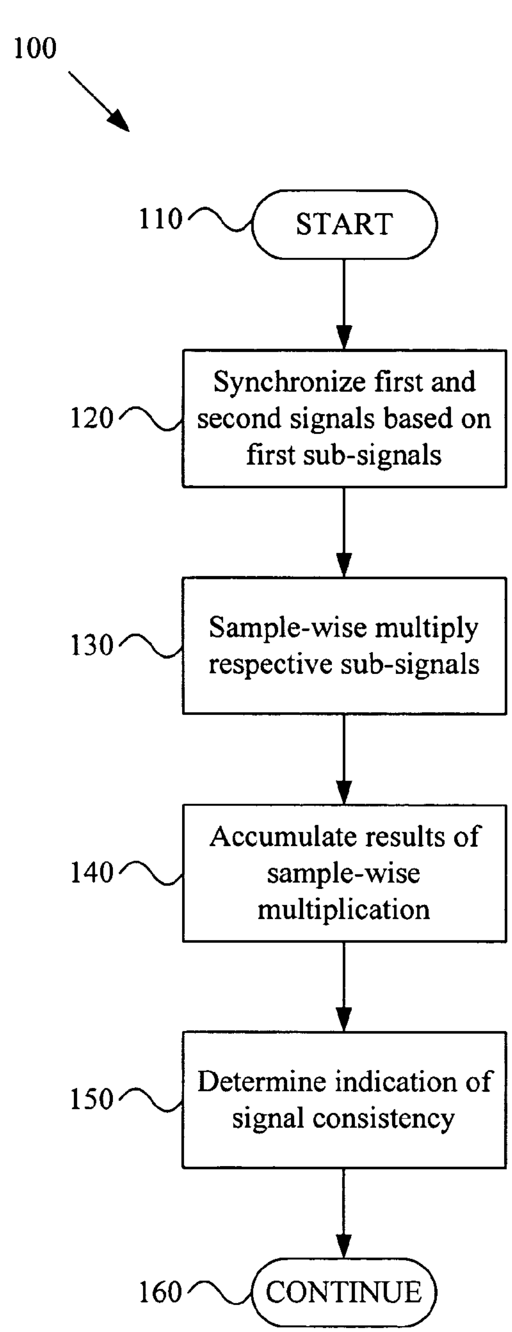
FIG. 1 is a flow diagram illustrating an exemplary phase based method for determining signal consistency, in accordance with various aspects of the present invention.

FIG. 1 is a flow diagram illustrating an exemplary phase based method 100 for determining signal consistency, in accordance with various aspects of the present invention. The exemplary method 100 may begin at step 110 in response to any of a large variety of causes and conditions. For example and without limitation, in an exemplary video signal-processing scenario, the method 100 may begin automatically as a video signal arrives at a signal processing system. Alternatively, for example, the method 100 may begin in response to an explicit user command to begin. Accordingly, the scope of various aspects of the present invention should not be limited by characteristics of any particular initiating events or conditions.

The exemplary method 100 may, at step 120, comprise synchronizing first and second signals based at least in part on respective first sub-signals of the first and second signals. Such synchronization may, for example and without limitation be viewed as a temporal synchronization, phase synchronization, data synchronization, etc. Some of the following exemplary illustrations may refer to temporal synchronization as an illustration of broader general synchronization. However, the scope of various aspects of the present invention should by no means be limited to temporal synchronization.

The first and second signals may comprise any of a large variety of signal and information types. The first and second signals may be analog or digital signals. For example, the first and second signals may be synchronously sampled or asynchronously sampled versions of originally analog signals. For example and without limitation, the first and second signals may carry video information, audio information, program information, synchronization information, graphical information, textual information, general data information, etc. Accordingly, the scope of various aspects of the present invention should not be limited by characteristics of particular signal or information types.

The first and second signals may each comprise a respective first sub-signal. Such a first sub-signal may comprise, for example, synchronization information. For example and without limitation, a first sub-signal may comprise a periodic synchronization signal. In an exemplary scenario where the first and second signals are video signals, such a periodic synchronization signal may comprise a chroma sub-carrier burst. Alternatively, for example, a first sub-signal may comprise a synchronization pulse. Also, for example, a first sub-signal may comprise synchronization data. Further, for example, a first sub-signal may comprise information that is not used for synchronization purposes.

In general, a first sub-signal may comprise any of a variety of information and have any of a variety of signal characteristics. Accordingly, the scope of various aspects of the present invention should not be limited by characteristics of a particular type of first sub-signal.

The first and second signals may, for example and without limitation, each comprise a respective second sub-signal. Such a second sub-signal may, for example, comprise synchronization information. Such synchronization information may comprise any of a variety of synchronization signals, such as, for example, a synchronization pulse, a periodic synchronization signal, or synchronization data. A second sub-signal may comprise, for example, video information, audio information, programming information, graphical information, textual information, general data information, etc. In an exemplary scenario where the first and second signals are video signals, the second sub-signal may comprise active video information, chroma burst information and/or a synchronization pulse. In general, the second sub-signal may comprise any of a variety of information types and have any of a variety of signal characteristics. Accordingly, the scope of various aspects of the present invention should not be limited by characteristics of a particular second sub-signal.

In at least one of the first and second signals, the first and second sub-signals may, for example, be time multiplexed. Alternatively, for example, the first and second sub-signals may be frequency multiplexed, code multiplexed or space multiplexed. The first and second sub-signals may be combined in their respective first and second signals in a variety of ways. Accordingly, the scope of various aspects of the present invention should not be limited by characteristics of a particular sub-signal combining or sub-signal multiplexing scheme.

Step 120 may comprise synchronizing (e.g., temporally synchronizing) the first and second signals using any of a variety of signal synchronization techniques. For example, step 120 may comprise phase locking the respective first sub-signals of the first and second signals. Step 120 may, for example, perform such phase locking utilizing a phase lock loop. Note that phase locking does not necessarily mean that the phase-locked signals have exactly the same phase. For example, signals may be locked into any of a variety of phase relationships (e.g., locked at 180-degrees out of phase). In an exemplary video signal scenario, where the respective first sub-signals of the first and second signals comprise chroma sub-carrier information, step 120 may comprise phase locking the respective chroma sub-carrier signals.

Alternatively, for example, step 120 may comprise detecting synchronization pulse information included in the respective first sub-signals; determining a timing differential based, at least in part, on the detected information; and temporally aligning the first and second signals according to the determined timing differential. Alternatively, for example, step 120 may comprise reading data (e.g., synchronization timing data) in at least one of the respective first sub-signals and utilizing such information to determine a timing differential, which is then used to temporally synchronize the first and second signals.

Step 120 may perform temporal synchronization using any of a variety of temporal alignment techniques. For example, step 120 may align the first and second signals by time-shifting one or both of the first and second signals. In an exemplary digital scenario, step 120 may, for example, comprise temporally aligning the first and second signals by whole samples or fractional samples (e.g., utilizing a fractional sample delay module). In an exemplary scenario where the first signal is a signal that was previously stored in memory, step 120 may comprise temporally shifting the first signal forward or backward in time relative to the second signal.

As an exemplary illustration, step 120 may comprise performing synchronization as discussed in U.S. patent application Ser. No. 10/794,601, filed Mar. 5, 2004, and entitled "Closed Loop Sub-carrier Synchronization System," which is hereby incorporated herein in its entirety by reference. It is stressed, however, that the scope of various aspects of the present invention should by no means be limited by aspects of such an exemplary system.

In general, step 120 may comprise synchronizing the first and second signals based at least in part on respective sub-signals of the first and second signals. Accordingly, the scope of various aspects of the present invention should not be limited by characteristics of a particular signal or a particular method for temporally synchronizing the signals.

The exemplary method 100 may, at step 130, comprise performing a sample-wise multiplication of respective sub-signals of the synchronized first and second signals for a plurality of samples. Alternatively, for example, step 130 may comprise performing signal multiplication in the analog domain (e.g., followed by sampling). For example, step 130 may comprise performing a sample-wise multiplication of at least a portion of the respective first sub-signals of the synchronized first and second signals for a plurality of samples. Alternatively, for example, step 130 may comprise performing a sample-wise multiplication of respective second sub-signals of the synchronized first and second signals for a plurality of samples.

In an exemplary digital signal-processing scenario, step 130 may, for example, comprise performing sample-wise multiplication of respective sub-signal values represented by any number of bits. For example and without limitation, each of the respective sub-signals may be represented by a single bit or a plurality of bits. In an exemplary single-bit scenario, sample-wise multiplication may comprise utilizing single bit logic. Accordingly, the scope of various aspects of the present invention should not be limited by a particular number of bits representing a signal value.

The exemplary method 100, at step 140, may comprise accumulating the results of the sample-wise multiplication for the plurality of samples. Such accumulating may, for example, comprise determining a running total and/or average of the results of the sample-wise multiplication of step 130. Such accumulating may, for example, comprise accumulating or integrating the results of the sample-wise multiplication over a time period. Such accumulating may, for example, comprise analog and/or digital signal processing.

For example and without limitation, in an exemplary video-processing scenario, step 140 may comprise accumulating the results of the sample-wise multiplication for a plurality of samples corresponding approximately to a chroma sync burst time period for a line of video information. Alternatively, for example, step 140 may comprise accumulating the results of the sample-wise multiplication for a plurality of samples corresponding to a portion of a chroma sync burst time period for a line of video information. Alternatively, for example, step 140 may comprise accumulating the results of the sample-wise multiplication for a plurality of samples corresponding to an entire line or multiple lines of video information.

In an exemplary video signal processing scenario, step 140 may comprise accumulating results from sample-wise multiplication of chroma burst samples in first and second signals associated with two corresponding lines in consecutive video frames. In one exemplary video scenario where the chroma burst signals from synchronized first and second video signals from consecutive video frames are substantially in-phase with each other, the accumulation may tend (i.e., move toward) positive. Such a phase relationship may, for example, be indicative of non-NTSC-compliant video signals. In another exemplary scenario where the chroma burst samples are substantially 180-degrees out of phase with each other, the accumulation may tend negative. Such a phase relationship may, for example, be indicative of NTSC-compliant video signals.

In general, step 140 may comprise accumulating the results of the sample-wise multiplication for the plurality of samples (e.g., as performed at step 130). Accordingly, the scope of various aspects of the present invention should not be limited by a particular type of accumulation/integration, or by a particular time frame for performing such an accumulation.

The exemplary method 100, at step 150, may comprise determining an indication of signal consistency by, at least in part, comparing the accumulated results to a threshold. For example and without limitation, a threshold value may be associated with determining whether the accumulated results are indicative of whether the first and second signals are NTSC compliant. Also for example, a threshold value may be associated with determining whether performing three-dimensional comb filtering utilizing the first and second signals is appropriate.

The threshold may, for example, be predetermined or determined in real-time based on changing conditions. A plurality of thresholds may be utilized. A threshold may, for example, comprise hysteresis characteristics. In an exemplary video-processing scenario, a threshold may be chosen to be indicative of a positive trend in the accumulation, which as mentioned previously, may correspond to respective sub-signals of the first and second signals being substantially in-phase relative to each other. In an exemplary video-processing scenario, a threshold may be chosen to be indicative of a negative trend in the accumulation, which as mentioned previously, may correspond to respective sub-signals of the first and second signals being substantially 180-degrees out of phase relative to each other.

In general, the threshold may comprise any of a large variety of threshold characteristics. Accordingly, the scope of various aspects of the present invention should not be limited by any particular threshold value or way of determining or managing a threshold value.

Step 150 may also, for example, comprise performing statistical processing on the results from the sample-wise multiplication of step 130 and/or the accumulation of step 140. For example, step 150 may comprise averaging, determining the mean, or determining a measure of statistical variance of the results from step 130 and/or step 140. Also for example, step 150 may comprise performing statistical trend analysis on a plurality of results from step 130 and/or step 140.

In an exemplary scenario, step 150 may comprise statistically analyzing results from step 130 and/or step 140 corresponding to a plurality of signal pairs. In an exemplary video processing scenario, step 150 may, for example, comprise statistically analyzing the step 130 and/or step 140 results for a first pair of spatially corresponding video lines from different video frames and for a second pair of spatially corresponding video lines from different video frames. In general, step 150 may comprise statistically analyzing step 130 and/or step 140 results for any number of signal pairs.

Step 150 may, for example, comprise generating a signal indicative of the results of the determination of signal consistency. For example and without limitation, step 150 may convert determination results to a signal that may be utilized by a subsequent signal processing apparatus or method.

The exemplary method 100 may, at step 160, comprise performing continued processing based on the results of the step 150 determination. For example, step 160 may comprise performing further processing on at least one of the first and second signals utilizing the determination results of step 150. In an exemplary video-processing scenario, step 160 may comprise utilizing the determination results of step 150 to determine whether the first and second signals represent a NTSC-compliant video signal. In an exemplary video-processing scenario, step 160 may comprise utilizing the determination results of step 150 to determine whether to perform three-dimensional comb filtering utilizing the first and second signals. The scope of various aspects of the present invention should not be limited by characteristics of particular continued processing.

The previous discussion regarding the exemplary method 100 illustrated in FIG. 1 described a method for determining a phase relationship between sub-signals utilizing sample-wise multiplication and accumulation. It should be noted that phase relationship between respective sub-signals of the first and second synchronized signals may be determined in any of a variety of ways. Accordingly, the scope of various aspects of the present invention should not be limited by characteristics of any particular manner of determining a phase relationship between signals.

Figure 2:
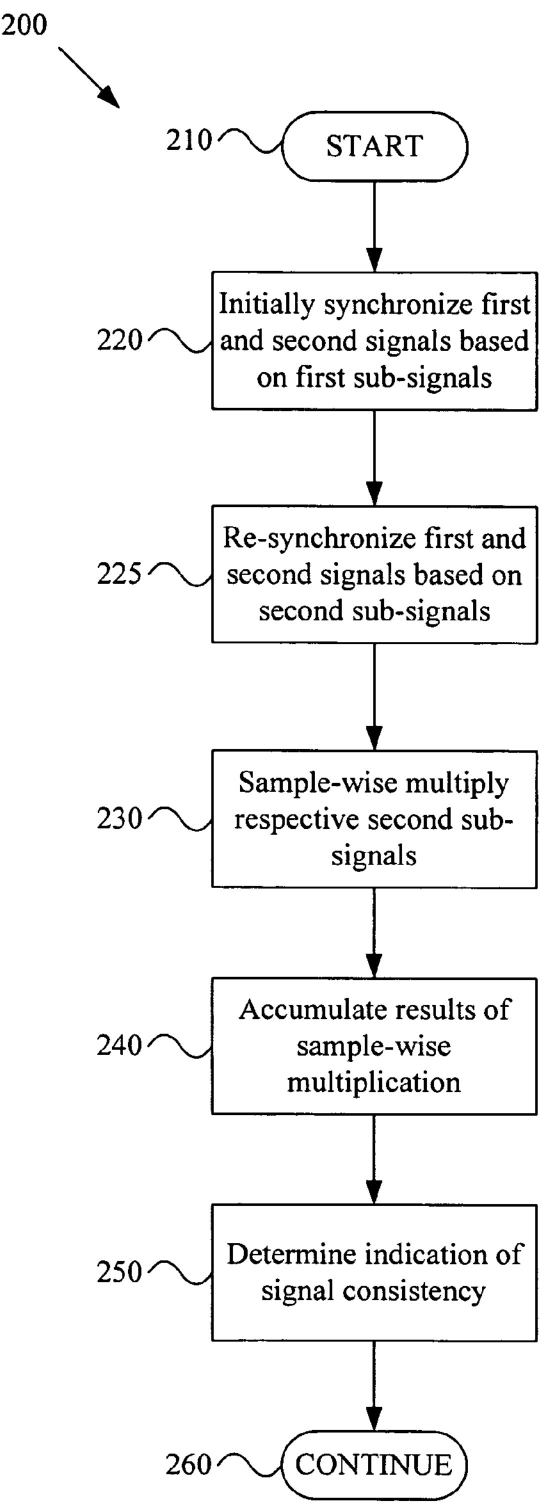
FIG. 2 is a flow diagram illustrating an exemplary phase based method for determining signal consistency, in accordance with various aspects of the present invention.

FIG. 2 is a flow diagram illustrating an exemplary phase based method 200 for determining signal consistency, in accordance with various aspects of the present invention. The exemplary method 200 may, for example and without limitation, share various characteristics with the exemplary method 100 illustrated in FIG. 1 and discussed previously.

The exemplary method 200 may begin at step 210. Step 210 may, for example, share various characteristics with step 110 of the exemplary method 100 illustrated in FIG. 1 and discussed previously.

The exemplary method 200 may, at step 220, comprise initially synchronizing first and second signals based at least in part on respective first sub-signals of the first and second signals. Step 220 may, for example, share various characteristics with step 120 of the exemplary method 100 illustrated in FIG. 1 and discussed previously.

The exemplary method 200 may, at step 225, comprise re-synchronizing the first signal and the second signal based at least in part on a second sub-signal of the first signal and a second sub-signal of the second signal. Such synchronization may, for example, be in addition to the synchronization performed at step 220. Step 225 may, for example, share various characteristics with step 120 of the exemplary method illustrated in FIG. 1 and discussed previously.

As discussed previously, the first and second signals may, for example and without limitation, each comprise a respective second sub-signal. Such a second sub-signal may, for example, comprise synchronization information. Such synchronization information may comprise any of a variety of synchronization signals, such as, for example, a synchronization pulse, a periodic synchronization signal, or synchronization data. A second sub-signal may comprise, for example, video information, audio information, programming information, graphical information, textual information, general data information, etc. In an exemplary scenario where the first and second signals are video signals, the second sub-signal may comprise active video information. In an exemplary video scenario, the second sub-signal may comprise chroma burst information and/or synchronization pulses. In general, the second sub-signal may comprise any of a variety of information types and have any of a variety of signal characteristics. Accordingly, the scope of various aspects of the present invention should not be limited by characteristics of a particular second sub-signal.

Step 225 may comprise re-synchronizing (e.g., temporally synchronizing) the first and second signals using any of a variety of signal synchronization techniques. For example, step 225 may comprise phase locking the respective second sub-signals of the first and second signals. Step 225 may, for example, perform such phase locking utilizing a phase lock loop. Note that phase locking does not necessarily mean that the phase-locked signals have exactly the same phase. For example, signals may be locked into any of a variety of phase relationships (e.g., locked at 180-degrees out of phase). In an exemplary video signal scenario, where the respective second sub-signals of the first and second signals comprise chroma sub-carrier information, step 225 may comprise phase locking the respective chroma sub-carrier signals.

Alternatively, for example, step 225 may comprise detecting synchronization pulse information included in the respective second sub-signals; determining a timing differential based, at least in part, on the detected information; and temporally aligning the first and second signals according to the determined timing differential. Alternatively, for example, step 225 may comprise reading data (e.g., synchronization timing data) in at least one of the respective second sub-signals and utilizing such information to determine a timing differential, which is then used to temporally synchronize the first and second signals.

Step 225 may perform temporal synchronization using any of a variety of temporal alignment techniques. For example, step 225 may align the first and second signals by time-shifting one or both of the first and second signals. In an exemplary digital scenario, step 225 may, for example, comprise temporally aligning the first and second signals by whole samples or fractional samples (e.g., utilizing a fractional sample delay module). In an exemplary scenario where the first signal is a signal that was previously stored in memory, step 225 may comprise temporally shifting the first signal forward or backward in time (or sample or sub-sample) relative to the second signal.

As an exemplary illustration, step 225 may comprise performing synchronization as discussed in U.S. patent application Ser. No. 10/794,601, filed Mar. 5, 2004, and entitled "Closed Loop Sub-carrier Synchronization System," which was previously incorporated herein in its entirety by reference. It is stressed, however, that the scope of various aspects of the present invention should by no means be limited by aspects of such an exemplary synchronization system.

In general, step 225 may comprise synchronizing the first and second signals based at least in part on respective second sub-signals of the first and second signals. Accordingly, the scope of various aspects of the present invention should not be limited by characteristics of a particular signal or a particular method for synchronizing the signals.

The exemplary method 200, at step 230, may comprise performing a sample-wise multiplication of the respective second sub-signals of the synchronized first and second signals for a plurality of samples. For example and without limitation, step 230 may share various characteristics with step 130 of the exemplary method 100 illustrated in FIG. 1 and discussed previously.

For example, step 230 may comprise performing a sample-wise multiplication of at least a portion of the respective second sub-signals of the synchronized first and second signals for a plurality of samples. Alternatively, for example, step 230 may comprise performing a sample-wise multiplication of respective first sub-signals of the synchronized first and second signals for a plurality of samples.

In an exemplary digital signal-processing scenario, step 230 may, for example, comprise performing sample-wise multiplication of respective sub-signal values represented by any number of bits. For example and without limitation, each of the respective sub-signals may be represented by a single bit or a plurality of bits. In an exemplary single-bit scenario, sample-wise multiplication may comprise utilizing single bit logic. Accordingly, the scope of various aspects of the present invention should not be limited by a particular number of bits representing a signal value.

The exemplary method 200, at step 240, may comprise accumulating the results of the sample-wise multiplication for the plurality of samples. For example and without limitation, step 240 may share various characteristics with step 140 of the exemplary method 100 illustrated in FIG. 1 and discussed previously.

For example, step 240, may comprise accumulating the results of the sample-wise multiplication for the plurality of samples. Such accumulating may, for example, comprise determining a running total and/or average of the results of the sample-wise multiplication of step 230. Such accumulating may, for example, comprise accumulating or integrating the results of the sample-wise multiplication over a time period. Such accumulating may, for example, be performed in the analog and/or digital domains.

For example and without limitation, in an exemplary video-processing scenario, step 240 may comprise accumulating the results of the sample-wise multiplication for a plurality of samples corresponding approximately to a chroma sync burst time period for a line of video information. Alternatively, for example, step 240 may comprise accumulating the results of the sample-wise multiplication for a plurality of samples corresponding to a portion of a chroma sync burst time period for a line of video information. Alternatively, for example, step 240 may comprise accumulating the results of the sample-wise multiplication for a plurality of samples corresponding to an entire line or multiple lines of video information.

In an exemplary video signal processing scenario, step 240 may comprise accumulating results from sample-wise multiplication of chroma burst samples in first and second signals associated with two corresponding lines in consecutive video frames. In one exemplary video scenario where the chroma burst signals from synchronized first and second video signals from consecutive video frames are substantially in-phase with each other, the accumulation may tend positive. Such a phase relationship may, for example, be indicative of non-NTSC-compliant video signals. In another exemplary scenario where the chroma burst samples are substantially 180-degrees out of phase with each other, the accumulation may tend negative. Such a phase relationship may, for example, be indicative of NTSC-compliant video signals.

In general, step 240 may comprise accumulating the results of the sample-wise multiplication for the plurality of samples (e.g., as performed at step 230). Accordingly, the scope of various aspects of the present invention should not be limited by a particular type of accumulation/integration, or by a particular time frame for performing the accumulation.

The exemplary method 200, at step 250, may comprise determining an indication of signal consistency by, at least in part, comparing the accumulated results to a threshold. For example and without limitation, step 250 may share various characteristics with step 150 of the exemplary method 100 illustrated in FIG. 1 and discussed previously.

For example, step 250 may comprise determining an indication of signal consistency by, at least in part, comparing the accumulated results to a threshold. For example and without limitation, a threshold value may be associated with determining whether the accumulated results are indicative of whether the first and second signals are NTSC compliant. Also for example, a threshold value may be associated with determining whether performing three-dimensional comb filtering utilizing the first and second signals is appropriate.

The threshold may, for example, be predetermined or determined in real-time based on changing conditions. A plurality of thresholds may be utilized. A threshold may, for example, comprise hysteresis characteristics. In an exemplary video-processing scenario, a threshold may be chosen to be indicative of a positive trend in the accumulation, which as mentioned previously, may correspond to respective sub-signals of the first and second signals being substantially in-phase relative to each other. In an exemplary video-processing scenario, a threshold may be chosen to be indicative of a negative trend in the accumulation, which as mentioned previously, may correspond to respective sub-signals of the first and second signals being substantially 180-degrees out of phase relative to each other.

In general, the threshold may comprise any of a large variety of threshold characteristics. Accordingly, the scope of various aspects of the present invention should not be limited by any particular threshold value or way of determining or managing a threshold value.

Step 250 may also, for example, comprise performing statistical processing on the results from the sample-wise multiplication of step 230 and/or the accumulation of step 240. For example, step 250 may comprise averaging, determining the mean, or determining a measure of statistical variance of the results from step 230 and/or step 240. Also for example, step 250 may comprise performing statistical trend analysis of a plurality of results from step 230 and/or step 240.

In an exemplary scenario, step 250 may comprise statistically analyzing results from step 230 and/or step 240 corresponding to a plurality of signal pairs. In an exemplary video processing scenario, step 250 may, for example, comprise statistically analyzing the step 230 and/or step 240 results for a first pair of spatially corresponding video lines from different video frames and for a second pair of spatially corresponding video lines from different video frames. In general, step 250 may comprise statistically analyzing step 230 and/or step 240 results for any number of signal pairs.

Step 250 may, for example, comprise generating a signal indicative of the results of the determination of signal consistency. For example and without limitation, step 250 may convert determination results to a signal that may be utilized by a subsequent signal processing apparatus or method.

The exemplary method 200 may, at step 260, comprise performing continued processing based on the results of the step 250 determination. For example and without limitation, step 260 may share various characteristics with step 160 of the exemplary method 100 illustrated in FIG. 1 and discussed previously.

For example, step 260 may comprise performing further processing on at least one of the first and second signals utilizing the determination results of step 250. In an exemplary video-processing scenario, step 260 may comprise utilizing the determination results of step 250 to determine whether the first and second signals represent a NTSC-compliant video signal. In an exemplary video-processing scenario, step 260 may comprise utilizing the determination results of step 250 to determine whether to perform three-dimensional comb filtering utilizing the first and second signals. The scope of various aspects of the present invention should not be limited by characteristics of particular continued processing.

The previous discussion regarding the exemplary method 200 illustrated in FIG. 2 described a method for determining a phase relationship between sub-signals utilizing sample-wise multiplication and accumulation. It should be noted that phase relationship between respective sub-signals of the first and second synchronized signals may be determined in any of a variety of ways. Accordingly, the scope of various aspects of the present invention should not be limited by characteristics of any particular manner of determining a phase relationship between signals.

Figure 3:
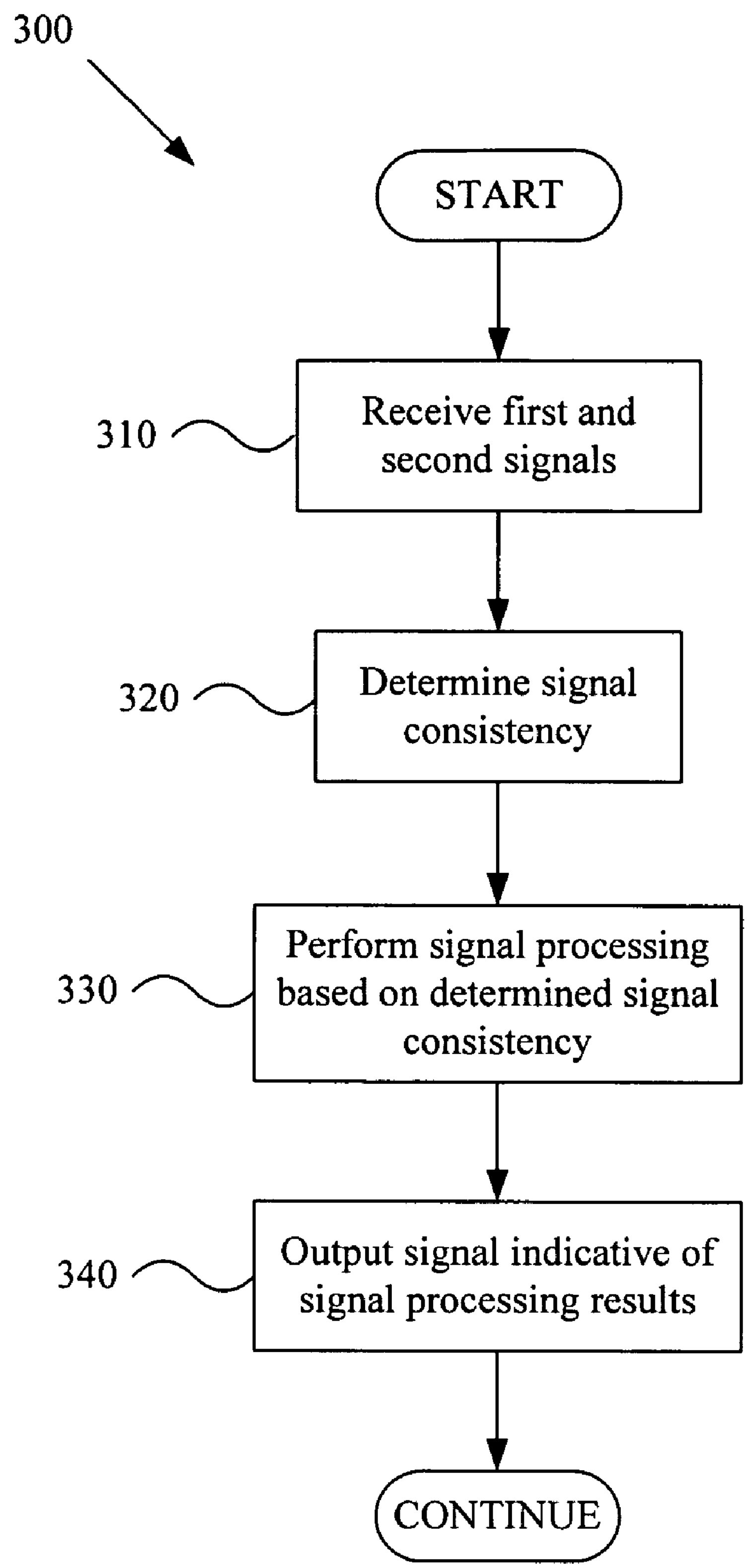
FIG. 3 is a flow diagram illustrating a signal processing method, in accordance with various aspects of the present invention.

FIG. 3 is a flow diagram illustrating a signal processing method 300, in accordance with various aspects of the present invention. The exemplary method 300, at step 310, may comprise receiving a first signal and a second signal. The first and second signals may, for example, be similar to the first and second signals described previously, with regard to the methods 100, 200 illustrated in FIGS. 1–2. The first and second signals may, for example, be received consecutively or simultaneously. Also, the first and second signals may be received from internal or external sources. For example and without limitation, the first signal may be received from a memory device, and the second signal may be received from upstream signal processing circuitry. Accordingly, the scope of various aspects of the present invention should not be limited by characteristics of a particular method of receiving a signal or by characteristics of a particular source of a signal.

The exemplary method 300 may, at step 320, comprise determining signal consistency between the received first and second signals. Such a consistency determination may, for example, comprise performing various aspects of the methods 100, 200 illustrated in FIGS. 1–2 and discussed previously.

For example and without limitation, step 320 may comprise: synchronizing the first signal and the second signal based at least in part on a first sub-signal of the first signal and a first sub-signal of the second signal; performing a sample-wise multiplication of respective sub-signals of the synchronized first and second signals for a plurality of samples; accumulating the results of the sample-wise multiplication for the plurality of samples; and determining an indication of signal consistency by, at least in part, comparing the accumulated results to a threshold.

Also for example and without limitation, step 320 may comprise: synchronizing the first signal and the second signal based at least in part on a first sub-signal of the first signal and a first sub-signal of the second signal; synchronizing the first signal and the second signal based at least in part on the second sub-signal of the first signal and the second sub-signal of the second signal; performing a sample-wise multiplication of the respective second sub-signals of the synchronized first and second signals for a plurality of samples; accumulating the results of the sample-wise multiplication for the plurality of samples; and determining an indication of signal consistency by, at least in part, comparing the accumulated results to a threshold.

The exemplary method 300, at step 330, may comprise performing signal processing on at least one of the first and second signals. Such signal processing may, for example, be a function of the signal consistency determined at step 320. For example, step 330 may comprise performing a first signal processing operation on at least one of the first and second signals when step 320 determines that the first and second signals meet a predetermined measure of signal consistency, and performing a second signal processing operation on at least one of the first and second signals when step 320 determines that the first and second signals do not meet the predetermined measure of signal consistency.

In an exemplary scenario comprising video signals, step 330 may comprise performing three-dimensional comb filtering using the first and second signals when step 320 determines that the first and second signals are consistent enough for such processing to be beneficial, and performing two-dimensional comb filtering using, either of the first and second signals when step 320 determines that the first and second signals are not consistent enough for three-dimensional comb filtering to be beneficial.

In general, step 330 may comprise performing signal processing on at least one of the first and second signals, where such signal processing is based, at least in part, on the signal consistency determined at step 320. Accordingly, the scope of various aspects of the present invention should not be limited by characteristics of a particular signal, signal processing technique or method for determining signal consistency.

The exemplary method 300, at step 340, may comprise outputting a signal indicative of the results of the step 330 signal processing (e.g., a signal based on or comprising the results of the step 330 signal processing). For example, step 340 may comprise outputting a digital data signal indicative of the results of the signal processing performed at step 330. For example, step 340 may comprise outputting a signal indicative of the results of the step 330 signal processing to a subsequent system that is capable of converting the output signal to a human-perceivable signal. In an exemplary video signal-processing scenario, step 340 may comprise outputting a signal indicative of the results of the step 330 signal processing to a television or computer system. In an exemplary audio signal-processing scenario, step 340 may comprise outputting a signal indicative of the results of the step 330 signal processing to a stereo, surround sound or multimedia system.

Alternatively, for example, step 340 may comprise outputting a signal indicative of the results of the step 330 signal processing to a user in human-perceivable form. In an exemplary video signal-processing scenario, step 340 may comprise outputting a signal to a user on a video display. In an exemplary audio signal-processing scenario, step 340 may comprise outputting a signal to a user through an audio output system.

Step 340 may generally comprise outputting a signal indicative of the results of the step 330 signal processing. Accordingly, the scope of various aspects of the present invention should not be limited by characteristics of a particular signal or signal processing technique. Nor should the scope of various aspects of the present invention be limited by characteristics of a particular form of output signal.

Figure 4:
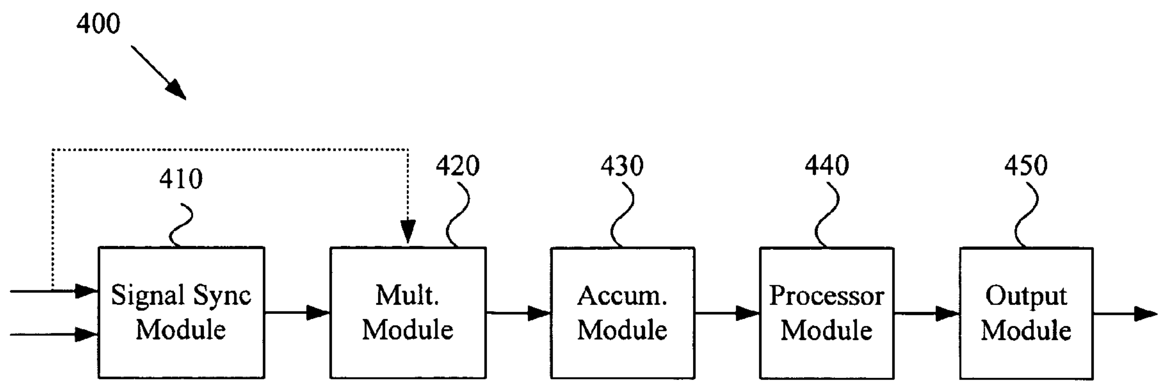
FIG. 4 is a diagram showing a system for generating a signal indicative of signal consistency, in accordance with various aspects of the present invention.

FIG. 4 is a diagram showing a system 400 for generating a signal indicative of signal consistency, in accordance with various aspects of the present invention. Various modules and components of the exemplary system 400 may, for example and without limitation, perform various functions of the exemplary methods 100, 200, 300 illustrated in FIGS. 1–3 and discussed previously. The exemplary system 400 may, for example generate a signal indicative of signal consistency utilizing a first signal and a second signal.

The first and second signals may comprise any of a large variety of signal and information types. The first and second signals may be analog or digital signals. For example, the first and second signals may be synchronously sampled or asynchronously sampled versions of originally analog signals. For example and without limitation, the first and second signals may carry video information, audio information, program information, synchronization information, graphical information, textual information, general data information, etc. Accordingly, the scope of various aspects of the present invention should not be limited by characteristics of particular signal or information types.

The first and second signals may each comprise a respective first sub-signal. Such a first sub-signal may comprise, for example, synchronization information. For example and without limitation, a first sub-signal may comprise a periodic synchronization signal. In an exemplary scenario where the first and second signals are video signals, such a periodic synchronization signal may comprise a chroma sub-carrier burst. Alternatively, for example, a first sub-signal may comprise a synchronization pulse. Also, for example, a first sub-signal may comprise synchronization data. Further, for example, a first sub-signal may comprise information that is not used for synchronization purposes. In general, a first sub-signal may comprise any of a variety of information and have any of a variety of signal characteristics. Accordingly, the scope of various aspects of the present invention should not be limited by characteristics of a particular type of first sub-signal.

The first and second signals may, for example and without limitation, each comprise a respective second sub-signal. Such a second sub-signal may, for example, comprise synchronization information. Such synchronization information may comprise any of a variety of synchronization signals, such as, for example, a synchronization pulse, a periodic synchronization signal, or synchronization data. A second sub-signal may comprise, for example, video information, audio information, programming information, graphical information, textual information, general data information, etc. In an exemplary scenario where the first and second signals are video signals, the second sub-signal may comprise active video information, chroma burst information and/or a synchronization pulse. In general, the second sub-signal may comprise any of a variety of information types and have any of a variety of signal characteristics. Accordingly, the scope of various aspects of the present invention should not be limited by characteristics of a particular second sub-signal.

In at least one of the first and second signals, the first and second sub-signals may, for example, be time multiplexed. Alternatively, for example, the first and second sub-signals may be frequency multiplexed, code multiplexed or space multiplexed. The first and second sub-signals may be combined in their respective first and second signals in a variety of ways. Accordingly, the scope of various aspects of the present invention should not be limited by characteristics of a particular sub-signal combining or sub-signal multiplexing scheme.

The exemplary system 400 may begin signal-processing activities in response to any of a large variety of causes and conditions. For example and without limitation, in an exemplary video signal-processing scenario, the system 400 may begin processing automatically as a video signal arrives at the exemplary signal processing system 400. Alternatively, for example, the system 400 may begin processing in response to an explicit user command to begin. Accordingly, the scope of various aspects of the present invention should not be limited by characteristics of any particular initiating events or conditions.

The exemplary system 400 may comprise a signal synchronization module 410 that synchronizes the first signal and the second signal by adjusting at least one of the first and second signals. The signal synchronization module 410 may, for example and without limitation, perform signal synchronization functionality as discussed with regard to steps 120, 220 and 225 of the exemplary methods 100, 200 illustrated in FIGS. 1–2 and discussed previously.

The signal synchronization module 410 may, for example, determine an adjustment based at least in part on the first sub-signal of the first signal and the first sub-signal of the second signal. Such synchronization may, for example and without limitation be viewed as a temporal synchronization, phase synchronization, data synchronization, etc. Some of the following exemplary illustrations may refer to temporal synchronization as an illustration of broader general synchronization. However, the scope of various aspects of the present invention should by no means be limited to temporal synchronization.

The signal synchronization module 410 may, for example, synchronize the first and second signals using any of a variety of signal synchronization techniques (e.g., temporal synchronization and/or data sample alignment). For example, the signal synchronization module 410 may phase lock the respective first sub-signals of the first and second signals. The signal synchronization module 410 may, for example, perform such phase locking utilizing a phase lock loop. Note that phase locking does not necessarily mean that the phase-locked signals have exactly the same phase. For example, signals may be locked into any of a variety of phase relationships (e.g., locked at 180-degrees out of phase). In an exemplary video signal scenario, where the respective first sub-signals of the first and second signals comprise chroma sub-carrier information, the signal synchronization module 410 may phase lock the respective chroma sub-carrier signals.

Alternatively, for example, the signal synchronization module 410 may detect synchronization pulse information included in the respective first sub-signals; determine a timing differential based, at least in part, on the detected information; and temporally align the first and second signals according to the determined timing differential. Alternatively, for example, the signal synchronization module 410 may read data (e.g., synchronization timing data) in at least one of the respective first sub-signals and utilize such information to determine a timing differential, which is then used to temporally synchronize the first and second signals.

The signal synchronization module 410 may, for example, perform temporal synchronization using any of a variety of temporal alignment techniques. For example, the signal synchronization module 410 may align the first and second signals by time-shifting one or both of the first and second signals. In an exemplary digital scenario, the signal synchronization module 410 may, for example, temporally align the first and second signals by whole samples or fractional samples (e.g., utilizing a fractional sample delay module). In an exemplary scenario where the first signal is a signal that was previously stored in memory, the signal synchronization module 410 may temporally shift the first signal forward or backward in time relative to the second signal.

As an exemplary illustration, the signal synchronization module 410 may perform synchronization as the exemplary systems discussed in U.S. patent application Ser. No. 10/794,601, filed Mar. 5, 2004, and entitled "Closed Loop Sub-carrier Synchronization System," which was previously incorporated herein in its entirety by reference. It is stressed, however, that the scope of various aspects of the present invention should by no means be limited by aspects of such exemplary systems.

In general, the signal synchronization module 410 may synchronize the first signal and the second signal by adjusting at least one of the first and second signals, the signal synchronization module determining an adjustment based at least in part on a first sub-signal of the first signal and a first sub-signal of the second signal. Accordingly, the scope of various aspects of the present invention should not be limited by characteristics of a particular signal or a particular method or apparatus for synchronizing signals.

In a further exemplary scenario, the signal synchronization module 410 may synchronize the first signal and the second signal based at least in part on a second sub-signal of the first signal and a second sub-signal of the second signal. Such synchronization may, for example, be in addition to synchronization based on respective first sub-signals of the first and second signals.

As discussed previously, the first and second signals may, for example and without limitation, each comprise a respective second sub-signal. Such a second sub-signal may, for example, comprise synchronization information. Such synchronization information may comprise any of a variety of synchronization signals, such as, for example, a synchronization pulse, a periodic synchronization signal, or synchronization data. A second sub-signal may comprise, for example, video information, audio information, programming information, graphical information, textual information, general data information, etc. In an exemplary scenario where the first and second signals are video signals, the second sub-signal may comprise active video information, chroma burst information and/or a synchronization pulse. In general, the second sub-signal may comprise any of a variety of information types and have any of a variety of signal characteristics. Accordingly, the scope of various aspects of the present invention should not be limited by characteristics of a particular second sub-signal.

The signal synchronization module 410 may, for example, synchronize the first and second signals, based at least in part on respective second sub-signals, using any of a variety of signal synchronization techniques. For example, the signal synchronization module 410 may phase lock the respective second sub-signals of the first and second signals. The signal synchronization module 410 may, for example, perform such phase locking utilizing a phase lock loop. Note that phase locking does not necessarily mean that the phase-locked signals have exactly the same phase. For example, signals may be locked into any of a variety of phase relationships (e.g., locked at 180-degrees out of phase). In an exemplary video signal scenario, where the respective second sub-signals of the first and second signals comprise chroma sub-carrier information, the signal synchronization module 410 may phase lock the respective chroma sub-carrier signals.

Alternatively, for example, the signal synchronization module 410 may detect synchronization pulse information included in the respective second sub-signals; determine a timing differential based, at least in part, on the detected information; and temporally align the first and second signals according to the determined timing differential. Alternatively, for example, the signal synchronization module 410 may read data (e.g., synchronization timing data) in at least one of the respective second sub-signals and utilize such information to determine a timing differential, which is then used to temporally synchronize the first and second signals.

The signal synchronization module 410 may, for example, perform temporal synchronization using any of a variety of temporal alignment techniques. For example, the signal synchronization module 410 may align the first and second signals by time-shifting one or both of the first and second signals. In an exemplary digital scenario, the signal synchronization module 410 may, for example, temporally align the first and second signals by whole samples or fractional samples (e.g., utilizing a fractional sample delay module). In an exemplary scenario where the first signal is a signal that was previously stored in memory, the signal synchronization module 410 may temporally shift the first signal forward or backward in time (or sample or sub-sample) relative to the second signal.

As an exemplary illustration, the signal synchronization module 410 may perform synchronization as discussed in U.S. patent application Ser. No. 10/794,601, filed Mar. 5, 2004, and entitled "Closed Loop Sub-carrier Synchronization System," which was previously incorporated herein in its entirety by reference. It is stressed, however, that the scope of various aspects of the present invention should by no means be limited by aspects of such an exemplary synchronization system.

In general, the signal synchronization module 410 may synchronize the first and second signals based at least in part on respective second sub-signals of the first and second signals. Accordingly, the scope of various aspects of the present invention should not be limited by characteristics of a particular signal or a particular method for synchronizing signals.

The exemplary system 400 may comprise a multiplication module 420 that performs a sample-wise multiplication of respective sub-signals of the synchronized first and second signals for a plurality of samples. Alternatively, for example, the multiplication module 420 may perform analog multiplication of respective sub-signals, the results of which may then be sampled or left in the analog domain. For example and without limitation, the exemplary multiplication module 420 may perform various functions of the methods 100, 200 (e.g., steps 130 and 230) illustrated in FIGS. 1–2 and discussed previously.

For example, the multiplication module 420 may perform a sample-wise multiplication of at least a portion of the respective first sub-signals of the synchronized first and second signals for a plurality of samples. Alternatively, for example, the multiplication module 420 may perform a sample-wise multiplication of respective second sub-signals of the synchronized first and second signals for a plurality of samples.

In an exemplary digital signal-processing scenario, the multiplication module 420 may, for example, perform sample-wise multiplication of respective sub-signal values represented by any number of bits. For example and without limitation, each of the respective sub-signals may be represented by a single bit or a plurality of bits. In such an exemplary single-bit scenario, sample-wise multiplication may comprise utilizing single bit logic. Accordingly, the scope of various aspects of the present invention should not be limited by a particular number of bits representing a signal value.

The exemplary system 400 may comprise an accumulator module 430 that accumulates the results of the sample-wise multiplication for the plurality of samples. The accumulator module 430 may, for example and without limitation, perform various functions of the methods 100, 200 (e.g., steps 140, 240) illustrated in FIGS. 1–2 and discussed previously.

For example, the accumulator module 430 may accumulate the results of the sample-wise multiplication (performed by the multiplication module 420) for the plurality of samples. Such accumulating may, for example, comprise determining a running total and/or average of the results of the sample-wise multiplication. Such accumulating may, for example, comprise accumulating or integrating the results of the sample-wise multiplication over a time period.

For example and without limitation, in an exemplary video-processing scenario, the accumulator module 430 may accumulate the results of the sample-wise multiplication for a plurality of samples corresponding approximately to a chroma sync burst time period for a line of video information. Alternatively, for example, the accumulator module 430 may accumulate the results of the sample-wise multiplication for a plurality of samples corresponding to a portion of a chroma sync burst time period for a line of video information. Alternatively, for example, the accumulator module 430 may accumulate the results of the sample-wise multiplication for a plurality of samples corresponding to an entire line or multiple lines of video information.

In an exemplary video signal processing scenario, the accumulator module 430 may accumulate results from sample-wise multiplication of chroma burst samples in first and second signals associated with two corresponding lines in consecutive video frames. In one exemplary video scenario where the chroma burst signals from synchronized first and second video signals from consecutive video frames are substantially in-phase with each other, the accumulation may tend positive. Such a phase relationship may, for example, occur when video signals are non-NTSC-compliant. In another exemplary scenario where the chroma burst samples are substantially 180-degrees out of phase with each other, the accumulation may tend negative. Such a phase relationship may, for example, occur when video signals are NTSC-compliant.

In general, the accumulator module 430 may accumulate the results of the sample-wise multiplication for the plurality of samples (e.g., as performed by the multiplication module 420). Accordingly, the scope of various aspects of the present invention should not be limited by a particular type of accumulation/integration, or by a particular apparatus for performing accumulation/integration, or by a particular time frame for performing the accumulation.

The exemplary system 400 may comprise a processor module 440 that determines signal consistency by, at least in part, comparing the accumulated results (e.g., from the accumulation module 430) to a threshold. The processor module 440 may, for example and without limitation, perform various functions of the methods 100, 200 (e.g., steps 150 and 250) illustrated in FIGS. 1–2 and discussed previously.

For example and without limitation, a threshold value may be associated with determining whether the accumulated results are indicative of whether the first and second signals are NTSC compliant. Also for example, a threshold value may be associated with determining whether performing three-dimensional comb filtering utilizing the first and second signals is appropriate.

The threshold may, for example, be predetermined or determined in real-time based on changing conditions. A plurality of thresholds may be utilized. A threshold may, for example, comprise hysteresis characteristics. In an exemplary video-processing scenario, a threshold may be chosen to be indicative of a positive trend in the accumulation, which as mentioned previously, may correspond to respective sub-signals of the first and second signals being substantially in-phase relative to each other. In an exemplary video-processing scenario, a threshold may be chosen to be indicative of a negative trend in the accumulation, which as mentioned previously, may correspond to respective sub-signals of the first and second signals being substantially 180-degrees out of phase relative to each other.

In general, the threshold may comprise any of a large variety of threshold characteristics. Accordingly, the scope of various aspects of the present invention should not be limited by any particular threshold value or way of determining or managing a threshold value.

The processor module 440 may, for example, perform statistical processing on the results from the sample-wise multiplication from the multiplication module 420 and/or the accumulator module 430. For example, the processor module 440 may determine the average, determine the mean, or determine a measure of statistical variance of the results from the multiplication module 420 and/or the accumulator module 430. Also for example, the processor module 440 may perform statistical trend analysis on a plurality of results from the multiplication module 420 and/or the accumulator module 430.

In an exemplary scenario, the processor module 450 may statistically analyze results from the multiplication module 420 and/or the accumulator module 430 corresponding to a plurality of signal pairs. In an exemplary video processing scenario, the processor module 450 may, for example, statistically analyze the results from the multiplication module 420 and/or the accumulator module 430 for a first pair of spatially corresponding video lines from different video frames and for a second pair of spatially corresponding video lines from different video frames. In general, the processor module 450 may statistically analyze the results from the multiplication module 420 and/or the accumulator module 430 for any number of signal pairs.

The exemplary system 400 may comprise an output module 450 that generates a signal indicative of the signal consistency. For example and without limitation, the output module 450 may convert determination results from the processor module 440 to a signal that may be utilized by a subsequent signal processing apparatus or method.

The output module 450 may communicate the signal indicative of the signal consistency to subsequent apparatus (e.g., hardware or software components or modules) that perform continued processing based on the determination of signal consistency. For example, subsequent apparatus may perform further processing on at least one of the first and second signals utilizing the determination results from the processor module 440. In an exemplary video-processing scenario, subsequent apparatus may utilize the determination results of the processor module 440 to determine whether the first and second signals represent a NTSC-compliant video signal. In an exemplary video-processing scenario, subsequent apparatus may utilize the determination results of the processor module 440 to determine whether to perform three-dimensional comb filtering utilizing the first and second signals. The scope of various aspects of the present invention should not be limited by characteristics of particular subsequent systems and/or apparatus.

Figure 5:
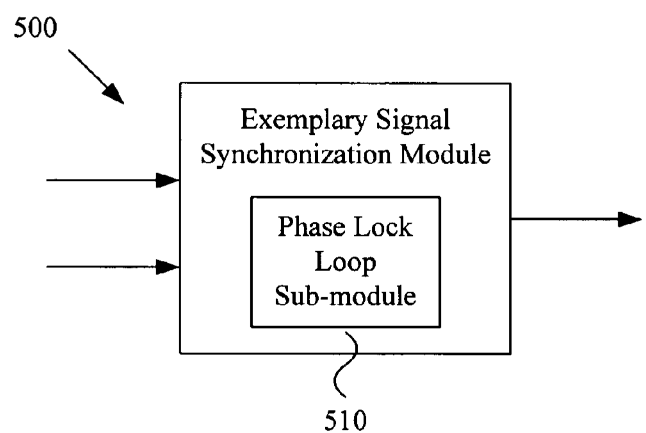
FIG. 5 is a diagram showing an exemplary signal synchronization module, in accordance with various aspects of the present invention.
Figure 6:
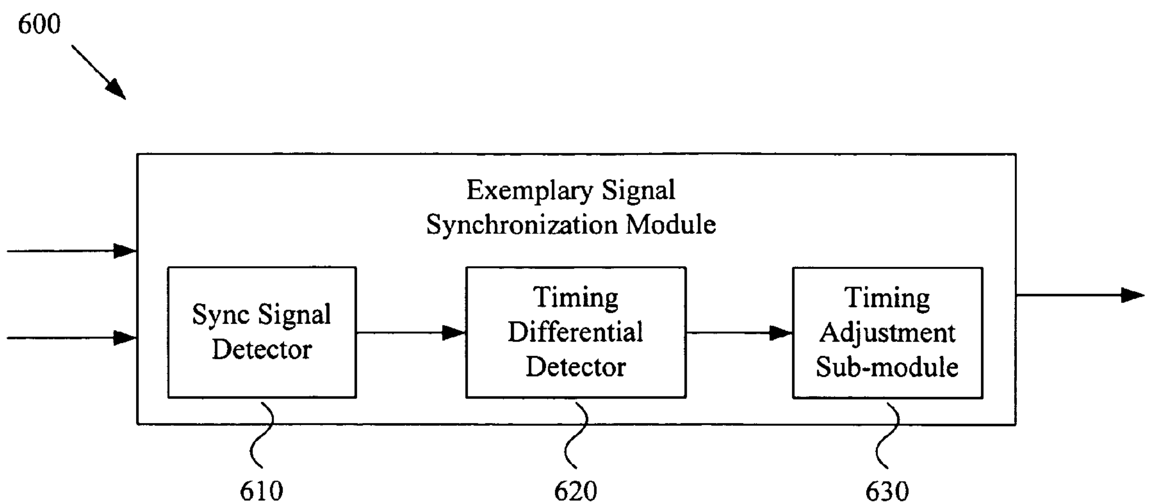
FIG. 6 is a diagram showing an exemplary signal synchronization module, in accordance with various aspects of the present invention.
Figure 7:
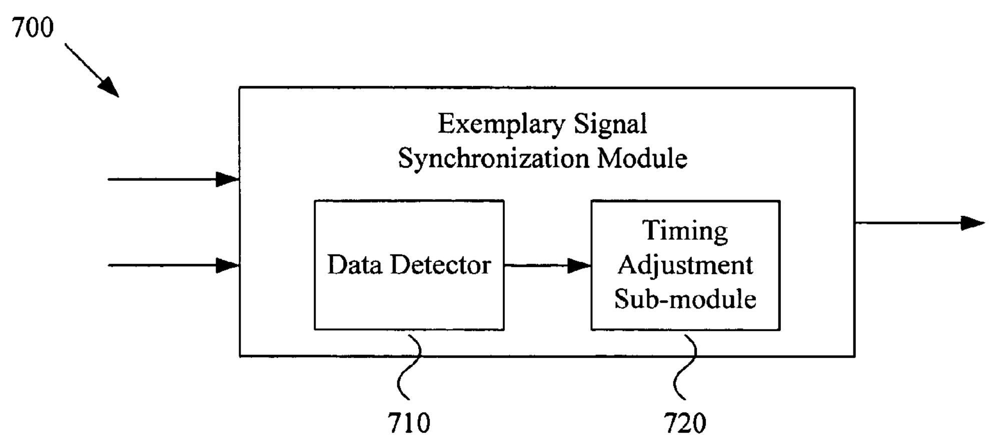
FIG. 7 is a diagram showing an exemplary signal synchronization module, in accordance with various aspects of the present invention.

The signal synchronization module 410 of the exemplary system 400 may take any of a large variety of forms. FIGS. 5–7 provide exemplary configurations. The exemplary configurations illustrated in FIGS. 5–7 are for illustrative purposes and should by no means limit the scope of various aspects of the present invention.

The previous discussion regarding the exemplary system 400 illustrated in FIG. 4 described a system (e.g., the multiplication module 420, accumulator module 430 and processor module 440) that determines and processes a phase relationship between sub-signals utilizing sample-wise multiplication and accumulation. It should be noted that a phase relationship between respective sub-signals of the first and second synchronized signals may be determined in any of a variety of ways by any of a variety of modules. For example and without limitation, the multiplication module 420 and accumulator module 430 may be replaced with a module that determines a phase relationship between signals in any of a variety of manners. Accordingly, the scope of various aspects of the present invention should not be limited by characteristics of any particular manner of determining a phase relationship between signals or mechanism for making such a determination.

FIG. 5 is a diagram showing an exemplary signal synchronization module 500, in accordance with various aspects of the present invention. The exemplary signal synchronization module 500 may be utilized as the signal synchronization module 410 of the exemplary system 400 illustrated in FIG. 4. The exemplary signal synchronization module 500 may comprise a phase lock loop sub-module 510 that temporally aligns the first and second signals by phase locking their respective sub-signals (e.g., respective first sub-signals and/or respective second sub-signals).

For example and without limitation, in an exemplary scenario comprising video signals, the phase lock loop sub-module 510 may receive the first and second signals. The exemplary first and second video signals may comprise respective sub-signals, each of which comprises chroma sub-carrier information. The exemplary phase lock loop sub-module 510 may then align (e.g., temporally) the first and second signals by locking the phases of the chroma sub-carrier information of the first signal and the chroma sub-carrier information of the second signal. The exemplary phase lock loop sub-module 510 may then output one or both of the temporally synchronized first and second signals.

The exemplary phase lock loop sub-module 510 may align (e.g., temporally or phase align) the first and second signals utilizing any of a variety of alignment circuits or techniques. For example and without limitation, the phase lock loop sub-module 510 may utilize a fractional sample delay circuit to adjust at least one of the signals. The phase lock loop sub-module 510 may, for example, perform signal alignment by adjusting sample clock frequency.

It should be noted that the exemplary signal synchronization module 500 illustrated in FIG. 5 is but one example of the signal synchronization module 410 illustrated in FIG. 4. Accordingly, the scope of various aspects of the present invention should not be limited by characteristics of the exemplary signal synchronization module 500 illustrated in FIG. 5, or by characteristics of a phase lock loop module.

For another example of a signal synchronization module 410, FIG. 6 shows a diagram illustrating an exemplary signal synchronization module 600, in accordance with various aspects of the present invention.

The exemplary signal synchronization module 600 illustrated in FIG. 6 may, for example, be utilized as the signal synchronization module 410 of FIG. 4. The exemplary signal synchronization module 600 may comprise a sync signal detector 610 that detects a synchronization signal in a sub-signal (e.g., a first sub-signal or a second sub-signal) of at least one of the first and second signals. The sync signal detector 610 may, for example, detect a sync pulse in the sub-signal. In an exemplary scenario involving video signals, the sync signal detector 610 may detect a horizontal sync pulse, a vertical sync pulse, or any other sync pulse that may reside in a video signal.

The exemplary signal synchronization module 600 may also comprise a timing differential detector 620 (or module), communicatively coupled to the sync signal detector 610, that determines a temporal shift based, at least in part, on the sync signal detected by the sync signal detector 610. For example, the timing differential detector 620 may compare timing of corresponding sync signals detected in the respective sub-signals of the first and second signals. Alternatively, for example, the timing differential detector 620 may compare timing of a sync signal detected in a sub-signal of the first signal with timing of another signal detected in a corresponding sub-signal of the second signal.

The exemplary signal synchronization module 600 may also comprise a timing adjustment sub-module 630, communicatively coupled to the timing differential detector 620, that adjusts timing of at least one of the first and second signals according the temporal shift determined by the timing differential detector 620. The timing adjustment module 630 may comprise any of a variety of circuits or modules that adjust signal timing. For example and without limitation, the timing adjustment sub-module 630 may comprise a whole sample delay circuit and/or a fractional sample delay circuit. In a scenario where at least a portion of the first or second signal is stored in a memory, the timing adjustment sub-module 630 may comprise a module that pushes a signal ahead in time rather than delaying the signal. After adjusting the signal timing of at least one of the first and second signals, the timing adjustment module 630 may output one or both of the temporally synchronized first and second signals.

It should be noted that the exemplary signal synchronization module 600 illustrated in FIG. 6 is but one example of the signal synchronization module 410 illustrated in FIG. 4. Accordingly, the scope of various aspects of the present invention should not be limited by characteristics of the exemplary signal synchronization module 600 illustrated in FIG. 6, or by characteristics of a particular sync signal detector, timing differential detector, or timing adjustment sub-module.

For another example of a signal synchronization module 410, FIG. 7 shows a diagram illustrating an exemplary signal synchronization module 700, in accordance with various aspects of the present invention. The exemplary signal synchronization module 700 illustrated in FIG. 7 may, for example, be utilized as the synchronization module 410 of FIG. 4. The exemplary signal synchronization module 700 may comprise a data detector 710 that detects synchronization data in a sub-signal (e.g., a first sub-signal and/or second sub-signal) of at least one of the first and second signals. The data detector 710 may, for example, detect information in at least one of the first and second signals that is indicative of signal timing. Such information may, for example, comprise signal timestamp information. The data detector 710 may then, for example, determine a temporal shift to synchronize the first and second signals.

The exemplary synchronization module 700 may also comprise a timing adjustment sub-module 720, communicatively coupled to the data detector 710, that adjusts timing of at least one of the first and second signals according to the temporal shift determined by the data detector 710.

It should be noted that the exemplary signal synchronization module 700 illustrated in FIG. 7 is but one example of the signal synchronization module 410 illustrated in FIG. 4. Accordingly, the scope of various aspects of the present invention should not be limited by characteristics of the exemplary signal synchronization module 700 illustrated in FIG. 7, or by characteristics of a particular data detector or timing adjustment sub-module.

Figure 8:
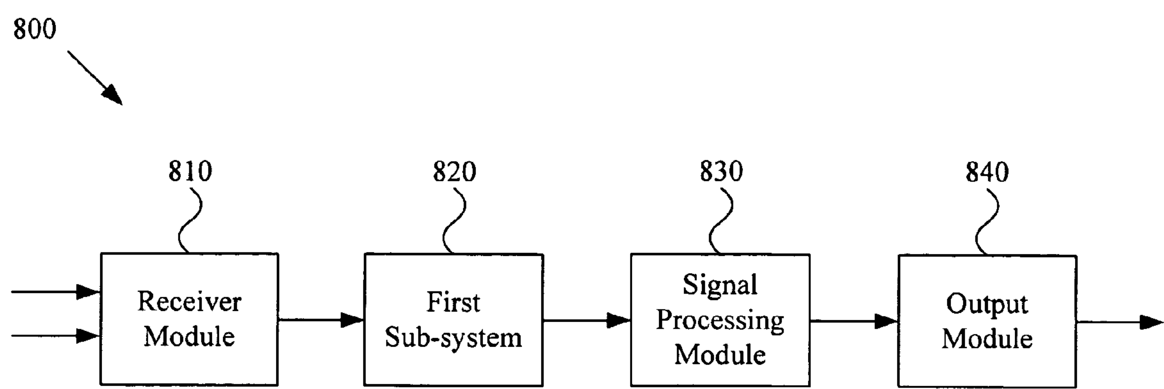
FIG. 8 is a diagram showing a signal processing system, in accordance with various aspects of the present invention.

FIG. 8 is a diagram showing a signal processing system 800, in accordance with various aspects of the present invention. The signal processing system 800 may comprise a receiver module 810 that receives a first signal and a second signal, each of the first signal and the second signal comprising a sub-signal (e.g., a first sub-signal and/or a second sub-signal). The first and second signals and their respective sub-signal(s) may, for example, be similar to the first and second signals described previously, with regard to the methods 100, 200, 300 illustrated in FIGS. 1–3 and the systems 400, 500, 600, 700 shown in FIGS. 4–7.

The receiver module 810 may, for example, receive the first and second signals consecutively or simultaneously. Also, the receiver module 810 may, for example, receive the first and second signals from internal or external sources. For example and without limitation, the receiver module 810 may receive the first signal from a local memory device, and the second signal from upstream signal processing circuitry. Accordingly, the scope of various aspects of the present invention should not be limited by characteristics of a particular apparatus for receiving a signal or by characteristics of a particular signal source.

The signal processing system 800 may comprise a first sub-system 820, communicatively coupled to the receiver module 810, that receives information of the first and second signals from the receiver module 810 and generates a signal indicative of signal consistency. The first sub-system 820 may, for example, comprise various aspects of the system 400 illustrated in FIG. 4 and discussed previously.

The first sub-system 820 may, for example, synchronize the first signal and the second signal according to respective sub-signals. The first sub-system 820 may, for example, perform sample-wise multiplication of respective sub-signals of the first and second signals and accumulate the results of the sample-wise multiplication. The first sub-system 820 may, for example, compare the accumulated results to a threshold to determine signal consistency and generate a signal indicative of the determined signal consistency.

The signal processing system 800 may comprise a signal-processing module 830, communicatively coupled to the first sub-system 820, that receives a signal indicative of signal consistency from the first sub-system 820 and also receives information of at least one of the first and second signals. The signal processing module 830 may, for example, perform signal processing on at least one of the first and second signals, where the signal processing is based, at least in part, on the signal indicative of signal consistency received from the first sub-system 820.

In an exemplary scenario involving video signals, the signal processing module 830 may perform signal processing comprising three-dimensional comb filtering using the first and second signals when the signal processing module 830 determines that the first and second signals are consistent enough for such processing to be beneficial, and performing two-dimensional comb filtering using either of the first and second signals when the signal processing module 830 determines that the first and second signals are not consistent enough for three-dimensional comb filtering to be beneficial.

In general, the signal processing module 830 may perform signal processing on at least one of the first and second signals, where such signal processing is based, at least in part, on the signal indicative of signal consistency received from the first sub-system 820. Accordingly, the scope of various aspects of the present invention should not be limited by characteristics of a particular signal type, signal processing technique or signal consistency determination.

The exemplary system 800 may comprise an output module 840, communicatively coupled to the signal-processing module 830, that outputs a signal indicative of the results of the signal processing performed by the signal-processing module 830. Alternatively, for example, the output module 840 may output a signal indicative of the signal processing performed by the signal-processing module 830 to a subsequent system capable of converting the output signal to a human-perceivable signal. In an exemplary video signal processing scenario, the output module 840 may output a signal indicative of the signal processing performed by the signal processing module 830 to a television or computer system with video output capability. In exemplary audio signal processing scenario, the output module 840 may output a signal indicative of the signal processing performed by the signal processing module 830 to a stereo, surround sound or computer system with audio output capability.

Alternatively, for example, the output module 840 may output a signal indicative of the signal processing performed by the signal-processing module 830 to a user in human-perceivable form. In an exemplary video signal-processing scenario, the output module 840 may comprise a video display module that outputs a human-perceivable signal to a user. In an exemplary audio signal-processing scenario, the output module 840 may comprise an audio output system that outputs a human-perceivable signal to a user.

The output module 840 may generally output a signal indicative of the results of the signal processing performed by the signal-processing module 830. Accordingly, the scope of various aspects of the present invention should not be limited by characteristics of a particular output signal or by characteristics of a particular apparatus utilized to output such a signal.

The previous discussion described various exemplary system modules and sub-modules. The various modules and sub-modules may be implemented using hardware, software, or a combination thereof. For example, the various modules may be geographically co-located or distributed over a network. For example and without limitation, any of the various modules and sub-modules may be independent circuits or may be integrated into a single integrated circuit. Accordingly, the scope of various aspects of the present invention should not be limited to characteristics of a particular hardware or software implementation.

In summary, various aspects of the present invention provide a system and method for determining signal consistency and for generating a signal indicative of such signal consistency. Additionally, various aspects of the present invention provide a system and method for performing signal processing that comprises utilization of such signal consistency information.

While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method for determining signal consistency utilizing a first signal and a second signal, each of the first signal and the second signal comprising a first sub-signal, the method comprising:

synchronizing the first signal and the second signal based at least in part on the first sub-signal of the first signal and the first sub-signal of the second signal;

performing a sample-wise multiplication of respective sub-signals of the synchronized first and second signals for a plurality of samples;

accumulating the results of the sample-wise multiplication for the plurality of samples; and determining an indication of signal consistency by, at least in part, comparing the accumulated results to a threshold.

2. The method of claim 1, wherein the respective first sub-signals of the first and second signals each comprise a chroma sub-carrier signal.

3. The method of claim 1, wherein synchronizing the first signal and the second signal comprises phase locking the first sub-signal of the first signal and the first sub-signal of the second signal.

4. The method of claim 1, wherein performing a sample-wise multiplication of respective sub-signals of the synchronized first and second signals for a plurality of samples comprises performing a sample-wise multiplication of the respective first sub-signals of the synchronized first and second signals for a plurality of samples.

5. The method of claim 1, wherein performing a sample-wise multiplication of respective sub-signals of the synchronized first and second signals for a plurality of samples comprises performing a sample-wise multiplication of respective second sub-signals of the synchronized first and second signals for a plurality of samples.

6. The method of claim 1, wherein determining an indication of signal consistency comprises determining whether the first and second signals are NTSC compliant.

7. The method of claim 1, wherein determining an indication of signal consistency comprises determining whether performing three-dimensional comb filtering utilizing the first and second signals is appropriate.

8. The method of claim 1, wherein the respective first sub-signals of the first and second signals each comprise a sync pulse signal.

9. The method of claim 1, wherein the first signal comprises a current video line signal, and the second signal comprises a stored video line signal.

10. A system for generating a signal indicative of signal consistency utilizing a first signal and a second signal, each of the first signal and the second signal comprising a first sub-signal, the system comprising at least one module adapted to:

synchronize the first signal and the second signal by adjusting at least one of the first and second signals, the first module determining an adjustment based at least in part on the first sub-signal of the first signal and the first sub-signal of the second signal;

perform a sample-wise multiplication of respective sub-signals of the synchronized first and second signals for a plurality of samples;

accumulate the results of the sample-wise multiplication for the plurality of samples;

determine signal consistency by, at least in part, comparing the accumulated results to a threshold; and generate a signal indicative of the signal consistency.

11. The system of claim 10, wherein the at least one module comprises:

a signal synchronization module;

a multiplication module;

an accumulator module;

a processor module; and an output module.

12. The system of claim 10, wherein the respective first sub-signals of the first and second signals each comprise a chroma sub-carrier signal.

13. The system of claim 10, wherein the at least one module is adapted to synchronize the first signal and the second signal by, at least in part, phase locking the first sub-signal of the first signal and the first sub-signal of the second signal.

14. The system of claim 10, wherein the at least one module is adapted to perform a sample-wise multiplication of respective sub-signals of the synchronized first and second signals for a plurality of samples by, at least in part, performing a sample-wise multiplication of the respective first sub-signals of the synchronized first and second signals for a plurality of samples.

15. The system or claim 10, wherein the at least one module is adapted to perform a sample-wise multiplication of respective sub-signals of the synchronized first and second signals for a plurality of samples by, at least in part, performing a sample-wise multiplication of respective second sub-signals of the synchronized first and second signals for a plurality of samples.

16. The system of claim 10, wherein the at least one module is further adapted to determine whether the first and second signals are NTSC compliant.

17. The system of claim 10, wherein the at least one module is further adapted to determine whether performing three-dimensional comb filtering utilizing the first and second signals is appropriate.

18. The system of claim 10, wherein the at least one module is integrated in a single integrated circuit.

19. The system of claim 10, wherein the respective first sub-signals of the first and second signals each comprise a sync pulse signal.

20. The system of claim 10, wherein the first signal comprises a current video line signal, and the second signal comprises a stored video line signal.

* * * * *